United States Patent
Chung

(10) Patent No.: US 10,104,749 B2
(45) Date of Patent: Oct. 16, 2018

(54) COMMUNICATION DEVICE AND LIGHTING DEVICE COMPRISING SAME

(71) Applicant: LG INNOTEK CO., LTD., Seoul (KR)

(72) Inventor: Won Suk Chung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/313,869

(22) PCT Filed: May 22, 2015

(86) PCT No.: PCT/KR2015/005213
§ 371 (c)(1),
(2) Date: Nov. 23, 2016

(87) PCT Pub. No.: WO2015/182938
PCT Pub. Date: Dec. 3, 2015

(65) Prior Publication Data
US 2017/0208669 A1    Jul. 20, 2017

(30) Foreign Application Priority Data

May 26, 2014  (KR) ..................... 10-2014-0062952

(51) Int. Cl.
*H05B 37/02* (2006.01)
*H05B 33/08* (2006.01)
(Continued)

(52) U.S. Cl.
CPC ..... *H05B 37/0272* (2013.01); *H05B 33/0854* (2013.01); *H05B 33/0872* (2013.01); *H04W 4/008* (2013.01); *H04W 4/80* (2018.02)

(58) Field of Classification Search
CPC ............ H05B 37/0272; H05B 37/0227; H05B 33/0869
See application file for complete search history.

(56) References Cited

U.S. PATENT DOCUMENTS 8,878,454 B2 * 11/2014 Rix .................... H05B 37/0245
315/291
2010/0118148 A1   5/2010 Lee
(Continued)

FOREIGN PATENT DOCUMENTS

JP        2008084613 A     4/2008
JP    WO 2014010239 A1 *  1/2014   ......... H05B 37/0227
(Continued)

OTHER PUBLICATIONS

International Search Report dated Sep. 17, 2015 in International Application No. 2015005213.

*Primary Examiner* — Tung X Le
*Assistant Examiner* — Henry Luong
(74) *Attorney, Agent, or Firm* — Saliwanchik, Lloyd & Eisenschenk

(57) ABSTRACT

A communication device according to an embodiment includes: a communication module including a first substrate, and a communication element attached to one surface of the first substrate; and a sensor module including a second substrate connected to the first substrate, and a sensor element attached to one surface of the second substrate. The communication module includes a first interface unit detachably connected to a connector of an object and configured to transmit, to the object, a lighting control signal received via a wireless network and a sensing signal sensed through the sensor module.

10 Claims, 16 Drawing Sheets

(51) Int. Cl.
*H04W 4/00* (2018.01)
*H04W 4/80* (2018.01)

(56) References Cited

U.S. PATENT DOCUMENTS

| | | |
|---|---|---|
| 2010/0176730 A1 | 7/2010 | Lee et al. |
| 2012/0181935 A1 | 7/2012 | Velazquez |
| 2013/0300318 A1* | 11/2013 | Kim .................. G08B 5/36 315/313 |
| 2015/0173157 A1* | 6/2015 | Setomoto .......... H05B 37/0227 315/153 |

FOREIGN PATENT DOCUMENTS

| | | |
|---|---|---|
| KR | 20090127571 A | 12/2009 |
| KR | 20110094679 A | 8/2011 |
| KR | 20140056995 A | 5/2014 |
| WO | WO-2009103587 A1 | 8/2009 |

\* cited by examiner

COMMUNICATION DEVICE AND LIGHTING DEVICE COMPRISING SAME

CROSS-REFERENCE TO RELATED APPLICATION

This application is the U.S. national stage application of International Patent Application No. PCT/KR2015/005213, filed May 22, 2015, which claims priority to Korean Application No. 10-2014-0062952, filed May 26, 2014, the disclosures of each of which are incorporated herein by reference in their entirety.

TECHNICAL FIELD

The present invention relates to a communication device, and more particularly, to a communication device and a lighting device including the same.

BACKGROUND ART

Generally, a lighting device is turned on or off by manually operating a switch connected to the lighting device by a wire. In this case, patients or the old and infirm who have mobility difficulties or children who cannot reach the switch have trouble turning on or off the lighting device.

Recently, in order to solve such inconvenience, a lighting device has been released which can turn on or off the lighting device or adjust illumination intensity by using a remote control system such as a remote controller.

As the lighting market becomes more diverse, there is an increasing demand for selectively controlling characteristics (color temperature, dimming values, brightness, etc.) of the lighting device or selecting a communication scheme from various wireless communication schemes (ZigBee, WiFi, Bluetooth, etc.) by taking into account a speed, a distance, power consumption, etc.

Also, a communication module that receives, processes, and transmits a user command is integrated with the lighting device. Thus, when failure occurs in a power supply unit (PSU) of the lighting device and/or failure occurs in an LED, general lighting equipment, and a controller of the lighting device, the whole lighting device including the communication module has to be replaced.

DISCLOSURE OF THE INVENTION

Technical Problem

Embodiments provide a communication device that is attachable to or detachable from a lighting device.

Also, embodiments provide a communication device including a communication module integrally formed with a sensor module.

Also, embodiments provide a communication device capable of performing lighting control by using sensing information acquired through an infrared (IR) sensor, and a lighting device including the communication device.

Technical problems to be achieved in embodiments set forth herein are not limited to the above-mentioned technical problems, and other technical problems will be fully understood from the following description by those skilled in the art to which the embodiments pertain.

Technical Solution

In one embodiment, a communication device includes: a communication module including a first substrate, and a communication element attached to one surface of the first substrate; and a sensor module including a second substrate connected to the first substrate, and a sensor element attached to one surface of the second substrate, wherein the communication module includes a first interface unit detachably connected to a connector of an object and configured to transmit, to the object, a lighting control signal received via a wireless network and a sensing signal sensed through the sensor module.

The control module includes: the first interface unit formed in a left region of an upper surface of the first substrate; a second interface unit formed in a right region of the upper surface of the first substrate; and a communication element mounted between the first interface unit and the second interface unit.

The sensor module includes a third interface unit formed on an upper surface of the second substrate and electrically connected to the second interface unit, and the sensor element is attached to a lower surface of the second substrate.

A protrusion protruding in a length direction of the first substrate is formed on a right side of the first substrate of the communication module, a connection hole penetrating the upper surface and the lower surface of the second substrate is formed in the second substrate, and the communication module is inserted into the connection hole of the second substrate and connected to the sensor module in a state of standing upright such that the protrusion of the first substrate is directed downward.

The second interface unit includes a plurality of pins, and right side surfaces of the plurality of pins are formed on the same vertical line as a right side surface of the first substrate.

Right side surfaces of the plurality of pins constituting the second interface unit contact the upper surface of the second substrate in a state of standing upright, and the third interface unit is formed in a region contacting the right side surfaces of the plurality of pins on the upper surface of the second substrate.

The plurality of pins constituting the second interface unit includes: a first pin for ground; a second pin for signal transmission; a third pin for signal reception; a fourth pin for analog signal reception; a fifth pin for power supply; and a sixth pin for a feeder line formation.

The third interface unit includes first to sixth pins respectively connected to the first to sixth pins of the second interface unit.

First to sixth pins of the third interface unit formed on the upper surface of the second substrate are respectively formed in regions contacting side surfaces of the first to sixth pins formed on the first substrate in a state in which the first substrate stands upright.

The sensor module includes: a light concentration plate disposed on the lower surface of the second substrate to cover the sensor element; and an antenna formed on the lower surface of the second substrate and disposed to surround the sensor element and the light concentration plate.

The communication device further includes: a housing having an inner accommodation space and accommodating the communication module except for the first interface unit; and a front protection cover disposed on the lower surface of the second substrate and covering the sensor element, the light concentration plate, and the antenna.

In another embodiment, a lighting device includes: a lighting module including at least one light source; and the communication device described above.

The sensor element is an infrared sensor, and the lighting module controls the at least one light source based on a human body sensing signal from the infrared sensor.

Advantageous Effects

According to embodiments, the communication device can be detachably formed in the lighting device. Thus, when the lighting unit of the lighting device is replaced, the communication device can be kept apart, thereby reducing costs.

According to embodiments, when the characteristics (color temperature, dimming value, brightness, etc.) of the lighting device in the communication module are controlled, the effective control can be performed by selectively using the PWM control method and the UART control method based on the characteristics to be controlled.

According to embodiments, various wireless communication schemes (ZigBee, WiFi, Bluetooth, etc.) can be selectively implemented in the wireless communication unit of the communication module. Thus, it is possible to perform an effective data transmission/reception and control by selectively using an optimal wireless communication scheme by taking into account a speed, a distance, and power consumption.

According to embodiments, the plurality of pins of the interface unit of the communication module can be standardized in predetermined order and according to purposes.

Also, according to embodiments, the communication module is integrally formed with the sensor module. Thus, it is possible to efficiently control the lighting by using the sensing signal of the sensor as well as the lighting control signal of the user transmitted from the outside.

MODE FOR CARRYING OUT THE INVENTION

Figure 1:
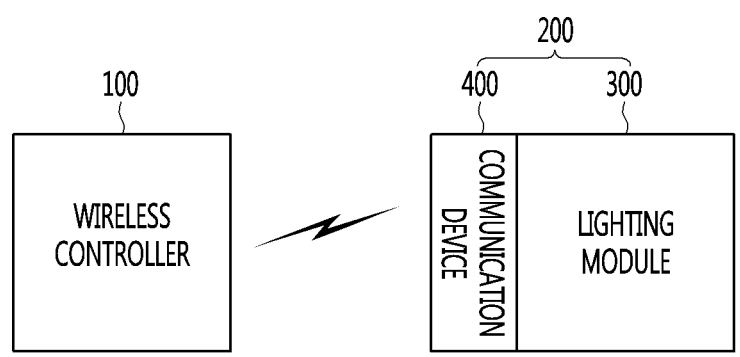
FIG. 1 is a configuration diagram of a lighting system according to an embodiment of the present invention.

Embodiments of the present invention will be described with reference to the accompanying drawings in such a manner that the embodiments may be easily carried out by those skilled in the art to which the present invention pertains. However, the present invention may be implemented in various forms and is not limited to the embodiments.

It will also be understood that the terms "comprises", "includes", and "has", when used herein, specify the presence of stated elements, but do not preclude the presence or addition of other elements, unless otherwise defined.

For clarity of description, parts having no relation to description are omitted. Thicknesses of layers and regions are exaggerated for clarity. Like reference numerals are assigned to like elements throughout the present invention and the drawings.

It will be understood that when a layer, film, region, or plate is referred to as being "formed on" another layer, film, region, or plate, it can be directly or indirectly formed on the other layer, film, region, or plate. That is, for example, intervening layers, films, regions, or plates may be present. In contrast, when a layer, film, region, or plate is referred to as being "formed directly on" another layer, film, region, or plate, it means that no intervening layers, films, regions, or plates are not present.

The present invention provides a lighting system including a communication module that is attachable to or detachable from a lighting module.

Hereinafter, a lighting system according to an embodiment of the present invention will be described with reference to the accompanying drawings.

Figure 2:
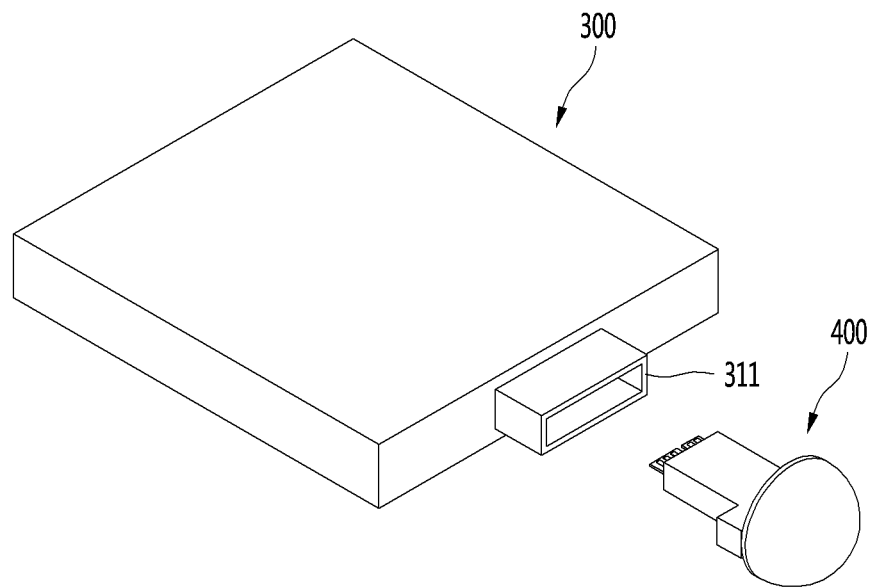
FIG. 2 is a perspective view of a lighting device of FIG. 1.
Figure 3:
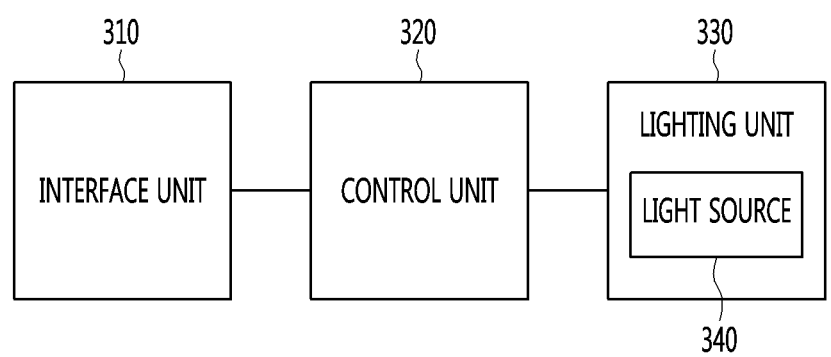
FIG. 3 is a configuration diagram of a lighting module of FIG. 1.
Figure 4:
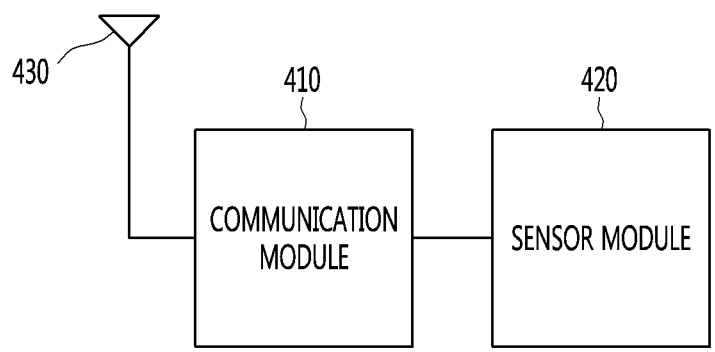
FIG. 4 is a configuration diagram of a communication device of FIG. 1.
Figure 5:
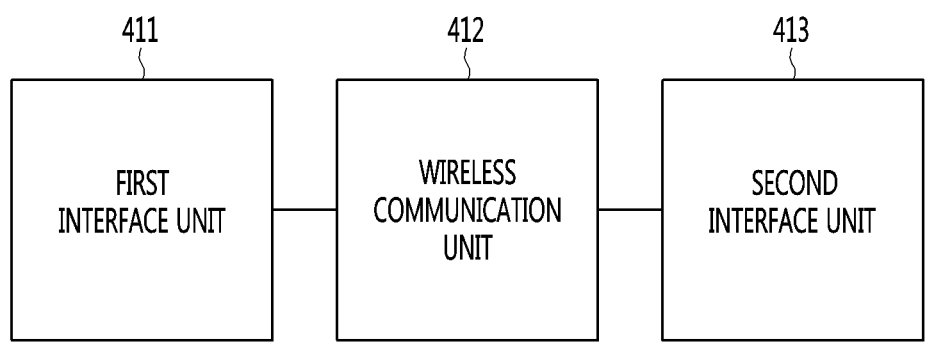
FIG. 5 is a configuration diagram of a communication module of FIG. 4.
Figure 6:
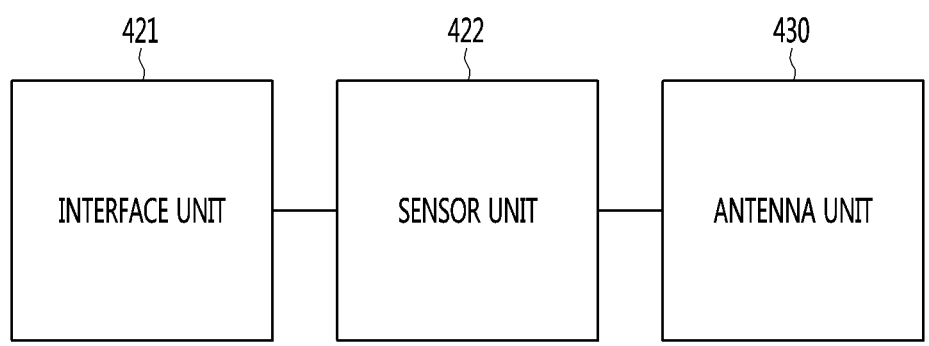
FIG. 6 is a configuration diagram of a sensor module of FIG. 4.

FIG. 1 is a configuration diagram of a lighting system according to an embodiment of the present invention, FIG. 2 is a perspective view of a lighting device of FIG. 1, FIG. 3 is a configuration diagram of a lighting module of FIG. 1, FIG. 4 is a configuration diagram of a communication device of FIG. 1, FIG. 5 is a configuration diagram of a communication module of FIG. 4, and FIG. 6 is a configuration diagram of a sensor module of FIG. 4.

Referring to FIG. 1, the lighting system according to an embodiment includes a wireless controller 100 and a lighting device 200.

The lighting device 200 includes a lighting module 300 and a communication device 400 that is detachably mounted on the lighting module 300.

The wireless controller 100 is configured to allow a user to input a user command. The wireless controller 100 transmits a control signal based on the user command to the communication device 400 mounted on the lighting device 200 via a wireless network.

The wireless controller 100 may be a remote controller or a smartphone.

The wireless network between the wireless controller 100 and the communication device 400 may be determined according to a wireless environment.

For example, the wireless network between the wireless controller 100 and the communication device 400 may be at least one of ZigBee, Bluetooth, and Z-wave.

In the lighting device 200, the lighting module 300 includes a lighting unit, and the communication device 400 performs communication with the wireless controller 100 and transmits a lighting control signal to the lighting module 300.

The communication device 400 constituting the lighting device 200 is inserted and fixed to a connector (not shown) of the lighting module 300 and transmits the lighting control signal to the lighting module 300.

In this regard, as shown in FIG. 2, the communication device 400 may be a detachable type communication device that may be attached to a connector 311 of the lighting module 300 or may be detached from the connector 311 of the lighting module 300.

The lighting module 300 includes the connector 311 to which a plurality of pins constituting a first interface unit 411 included in the communication device 400 is inserted and fixed.

As shown in FIG. 2, the connector 311 may protrude outward. However, this is merely an example, and the connector 311 may be formed to have a groove shape recessed into a body of the lighting module 300.

As shown in FIG. 3, the lighting module 300 includes an interface unit 310, a control unit 320, and a lighting unit 330.

The interface unit 310 of the lighting module 300 includes the connector 311 that is connected to the communication device 400 and receives the lighting control signal transmitted from the communication device 400.

The control unit 320 includes a power supply unit and is configured to receive an output signal of the interface unit 310 and output a lighting signal for controlling the lighting unit 330 by using the received output signal.

The lighting unit 330 includes a light source 340.

The light source 340 may include at least one light-emitting diode (LED).

The interface unit 310 includes five pins and is connected to the first interface unit of the communication device 400 (which will be described below). On the other hand, the number of pins of the interface unit 310 is not limited to five. The number of pins of the interface unit 310 may be larger or smaller than that shown in the drawing.

Like the interface unit 310 of the lighting module 300, the first interface unit of the communication device 400 also may have five pins.

Referring to FIG. 4, the communication device 400 includes a communication module 410, a sensor module 420, and an antenna 430.

The communication module 410 receives the lighting control signal transmitted from the wireless controller 100 and transmits the received lighting control signal to the lighting module 300.

Also, the communication module 410 receives a sensing signal sensed through the sensor module 420 and transmits the received sensing signal to the lighting module 300.

The antenna 430 receives the lighting control signal transmitted from the wireless controller 100.

The sensor module 420 includes at least one sensor and is configured to sense a signal through the sensor and transmit the sensed signal to the communication module 410.

Referring to FIG. 5, the communication module 410 includes a first interface unit 411, a wireless communication unit 412, and a second interface unit 413.

The first interface unit 411 includes a plurality of pins and is connected to the interface unit 310 of the lighting module 300.

The configurations of the first interface unit 411 of the communication module 410 and the interface unit 310 of the lighting module 300 will be described below in more detail.

The wireless communication unit 412 receives the lighting control signal from the antenna 430 and generates a plurality of output signals to be transmitted to the lighting module 300 according to the received lighting control signal.

The wireless communication unit 412 includes a communication integrated circuit (not shown) configured to analyze the lighting control signal received through the antenna 430 according to a type of the wireless network.

The communication module 410 may be mounted into the wireless communication unit 412 by selectively selecting the communication integrated circuit according to a predetermined wireless network environment.

The communication integrated circuit may support at least one of communication schemes such as ZigBee, Z-wave, WiFi, and Bluetooth.

The second interface unit 413 includes a plurality of pins for performing communication with the sensor module 420.

The function of the pins constituting the second interface unit 413 will be described below in detail.

Referring to FIG. 6, the sensor module 420 includes an interface unit 421, a sensor unit 422, and an antenna unit 430.

The interface unit 421 is connected to the second interface unit 413 of the communication module 410 and transmits a sensing signal acquired through the sensor unit 422 to the communication module 410.

The interface unit 421 includes a plurality of pins that are respectively connected to the plurality of pins constituting the second interface unit 413 of the communication module 410.

The sensor unit 422 acquires a sensing signal according to a function thereof.

The sensor unit 422 may include at leas one of a pyroelectric infrared ray (PIR) sensor, an illumination sensor, a temperature sensor, a humidity sensor, and an infrared sensor.

Preferably, the sensor unit 422 is implemented by the IR sensor. Accordingly, the sensor unit 422 performs an operation of continuously sensing a human body and transmits a sensing signal to the interface unit 421 according to sensing or non-sensing of the human body.

The antenna unit 430 is connected to the communication module 410 and is configured to receive the lighting control signal transmitted through the wireless controller 100 and transmit the received lighting control signal to the communication module 410.

Hereinafter, the communication device 400 will be described in more detail.

Figure 7:
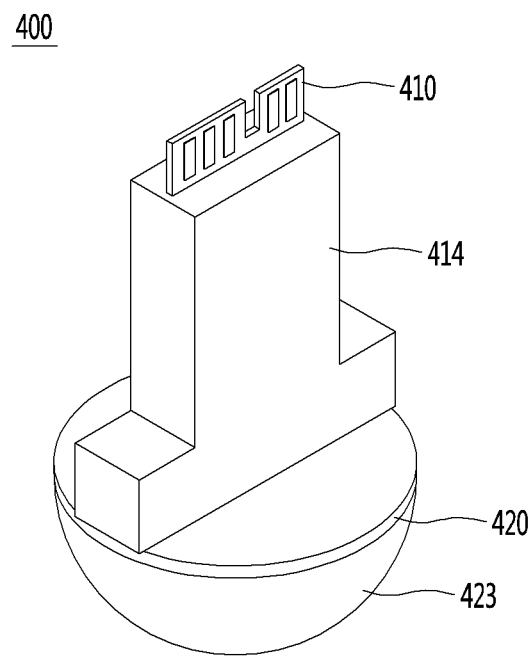
FIG. 7 is a perspective view of a communication device according to an embodiment of the present invention.
Figure 8:
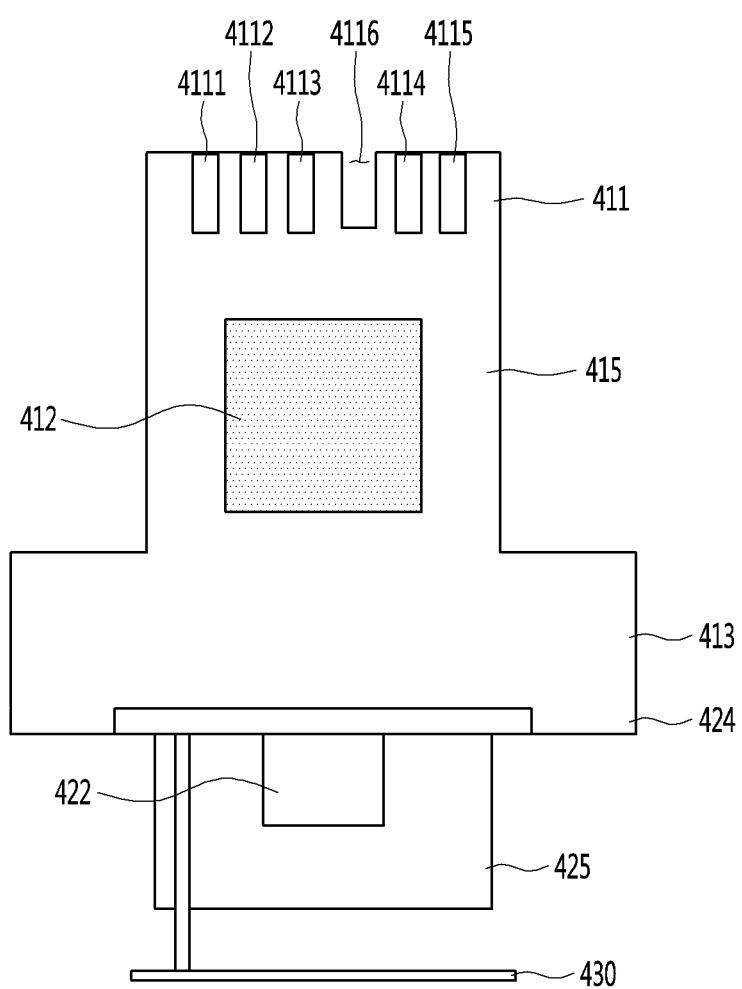
FIG. 8 is a front view of the communication device of FIG. 7.
Figure 9:
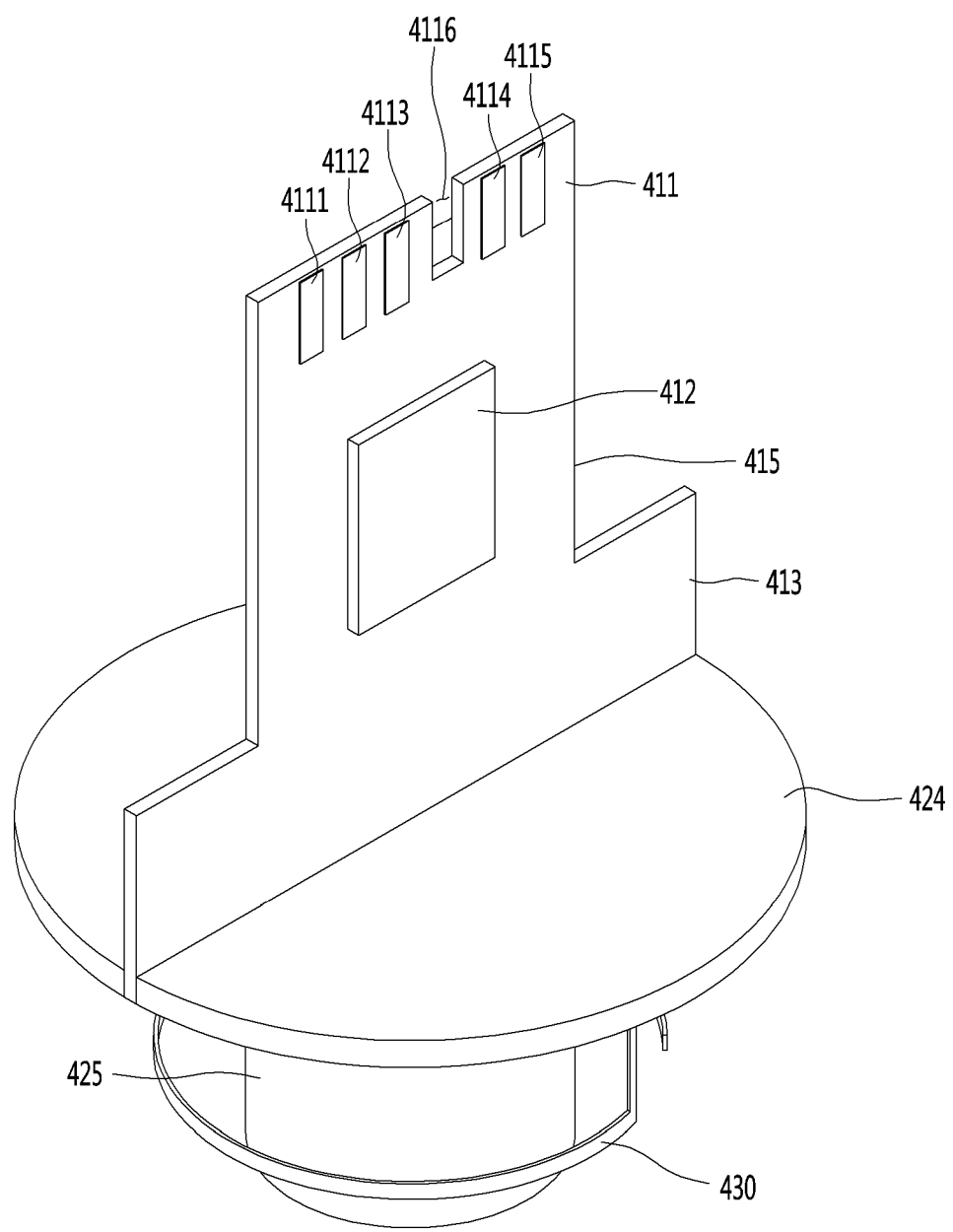
FIG. 9 is a side view of the communication device of FIG. 7.
Figure 10:
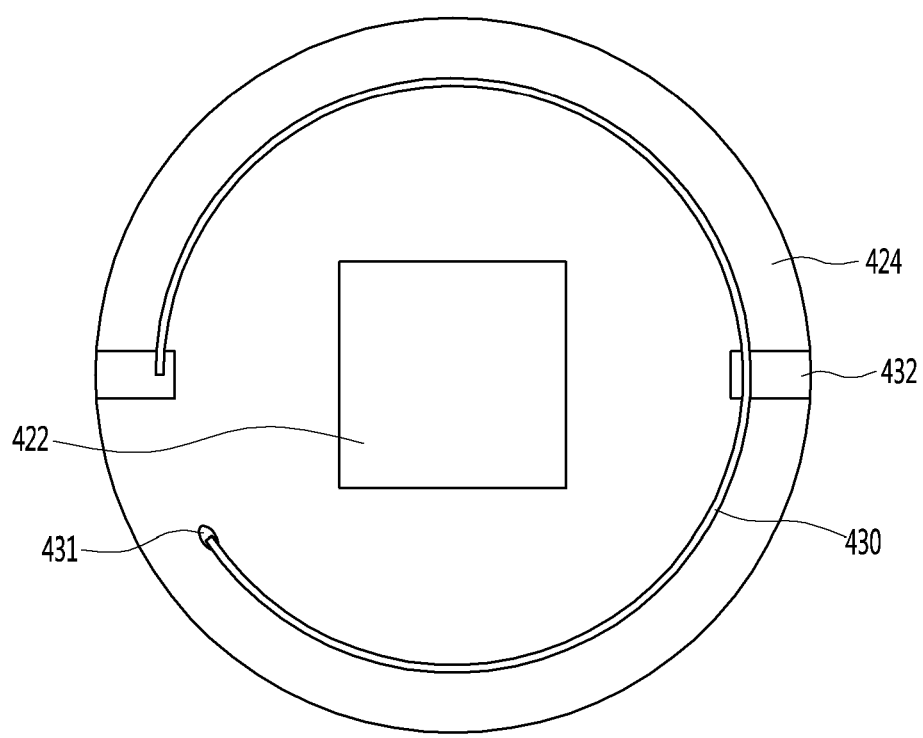
FIG. 10 is a rear view of the communication device of FIG. 7.

FIG. 7 is a perspective view of the communication device 400 according to an embodiment of the present invention, FIG. 8 is a front view of the communication device of FIG. 7, FIG. 9 is a side view of the communication device of FIG. 7, and FIG. 10 is a rear view of the communication device of FIG. 7.

Referring to FIGS. 7 to 10, the communication device 400 includes a communication module 410 and a sensor module 420.

The communication module 410 is accommodated in a housing 414, and the sensor module 420 is accommodated in a front protection cover 423.

In this case, only a part of the communication module 410 is accommodated in the housing 414. In other words, the second interface unit 413 and the wireless communication unit 412 constituting the communication module 410 are accommodated in the housing 414, and the first interface unit 411 is exposed to the outside of the housing 414.

The sensor module 420 is accommodated in the front protection cover 423, and thus, the sensor module 420 is protected by the front protection cover 423.

The communication module 410 includes a first substrate 415, a first interface unit 411 disposed in a first region on an upper surface of the first substrate 415, a wireless communication unit 412 disposed in a second region on the upper surface of the first substrate 415, and a second interface unit 413 disposed in a third region on the upper surface of the first substrate 415.

The first interface unit 411 includes a first pin 4111, a second pin 4112, a third pin 4113, a fourth pin 4114, and a fifth pin 4115.

In this case, the plurality of pins constituting the first interface unit 411 may be grouped in an arbitrary number.

In other words, the first pin 4111, the second pin 4112, and the third pin 4113 are grouped into a first group, and the fourth pin 4114 and the fifth pin 4115 are grouped into a second group.

In this case, a part of the first substrate 415 between the first group and the second group is removed to form a recess 4116.

The sensor module 420 includes a second substrate 424, a sensor unit 422 attached to the second substrate 424, a light concentration plate 425 formed on the substrate 424 to cover the sensor unit 422, and an antenna 430 formed on the second substrate 424.

The sensor unit 422, the light concentration plate 425, and the antenna 430 are formed on a first surface of the second substrate 424.

A second surface of the second substrate 424 contacts the first substrate 415.

In other words, the first substrate 415 is connected to the upper surface of the second substrate 424 in a state of standing upright.

The connected structure of the first substrate 415 and the second substrate 424 will be described below in more detail.

On the other hand, a feed point 431 to be connected to the antenna 430 is formed on a first surface of the second substrate 424.

In this case, the antenna 430 is disposed spaced apart from the first surface of the second substrate 424 at regular intervals.

Accordingly, a fixing member 432 for fixing the antenna 430 to the second substrate 424 is formed on the second substrate 424.

Hereinafter, the communication module 410 and the sensor module 420 will be described in more detail.

Figure 11:
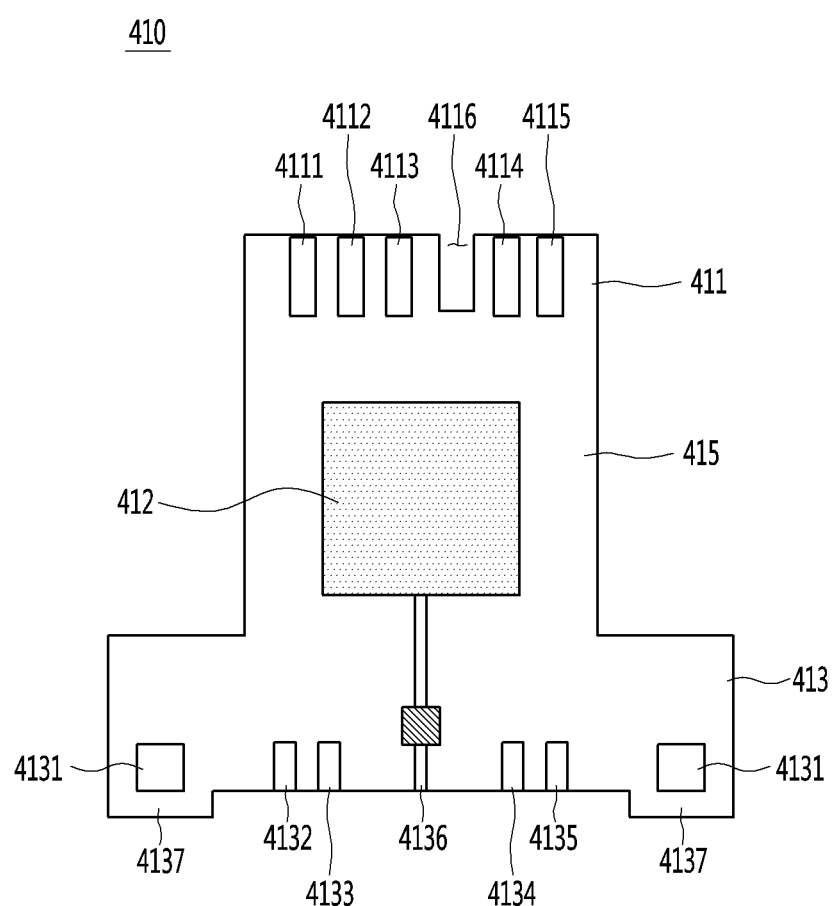
FIG. 11 is a view illustrating a detailed configuration of a communication module according to an embodiment of the present invention.

FIG. 11 is a viewing illustrating a detailed configuration of the communication module 410 according to an embodiment of the present invention.

Referring to FIG. 11, the communication module 410 includes a first substrate 415.

The first substrate 415 may be a substrate in which a circuit pattern is printed on an insulator. For example, the first substrate 415 may include a printed circuit board (PCB), a metal core PCB, a flexible PCB, a ceramic PCB, and the like. Also, the first substrate 415 may be made of a material which efficiently reflects light, or the surface of the first substrate 415 may have a color which effectively reflects light, for example, a white color, a silver color, or the like.

A first interface unit 411 and a second interface unit 413 are formed on the first substrate 415.

A wireless communication unit 412 (preferably, a communication element) is formed between the first interface unit 411 and the second interface unit 413 on an upper surface of first substrate 415.

That is, the upper surface of the first substrate 415 includes a first region where the first interface unit 411 is formed, a second region where the wireless communication unit 412 is formed, and a third region where the second interface unit 413 is formed.

In this case, the first region is a left upper surface region of the first substrate 415, the second region is a middle upper surface region of the first substrate 415, and a third region is a right upper surface region of the first substrate 415.

A plurality of pins are printed in the first region of the first substrate 415.

As described above, the plurality of pins include a first pin 4111, a second pin 4112, a third pin 4113, a fourth pin 4114, and a fifth pin 4115.

The plurality of pins may include five pins as illustrated, but the present invention is not limited thereto.

If the plurality of pins are formed as described above, the plurality of pins may be grouped in an arbitrary number.

In other words, the first pin 4111, the second pin 4112, and the third pin 4113 are grouped into a first group, and the fourth pin 4114 and the fifth pin 4115 are grouped into a second group.

In this case, a part of the first substrate 415 between the first group and the second group is removed to form a recess 4116.

On the other hand, it is preferable that the first group and the second group include a different number of pins.

For example, the first group may include three pins, and the second group may include only two pins unlike the first group.

As such, by grouping the plurality of pins into groups having a different number of pins, it is possible to easily distinguish between the front surface and the rear surface of the communication module 410.

Also, the recess 4116 may be formed between the first group and the second group, and it is possible to reduce mutual interference that may occur between the pins of the first group and the pins of the second group.

In this case, the recess 4116 may have a width of 0.9 mm or more, and a spacing width between the plurality of pins may be set to be 0.8 mm or less, but the present invention is not limited thereto.

Although not illustrated, a protrusion protruding from the first substrate 415 may be further formed in an interface region between the pins of the first group and the pins of the second group.

On the other hand, the plurality of pins formed on the first substrate 415 may be an electrode layer and may be formed by printing, on the first substrate 415, an alloy including at least one of copper, aluminum, molybdenum, and tungsten, which are conductive materials.

Also, the electrode layer may be formed by patterning a copper foil layer formed on the first substrate 415.

The first interface unit 411 is formed in a left end region (the first region described above) on the upper surface of the first substrate 415.

The wireless communication unit 412 is formed in the second region of the first substrate 415. Preferably, the communication element is attached to the second region of the first substrate 415.

The communication element is disposed in a region spaced apart from the first interface unit 411 by a predetermined distance on the upper surface of the first substrate 415. The communication element receives a lighting control signal through the antenna 430 or outputs a control signal based on the received lighting control signal.

The communication element is connected to the plurality of pins constituting the first interface unit 411.

A second interface unit 413 is formed in the third region of the first substrate 415.

The second interface unit 413 includes a plurality of pins. The plurality of pins constituting the second interface unit 413 are respectively connected to a plurality of pins constituting the interface unit 421 of the sensor module 420, which will be described below.

The second interface unit 413 includes a plurality of first pins 4131 on both ends thereof and includes a second pin 4132, a third pin 4133, a fourth pin 4134, a fifth pin 4135, and a sixth pin 4136 between the plurality of first pins 4131.

In this case, a protrusion 4137 is formed in the first substrate 415 where the second interface unit 413 is formed.

The protrusion 4137 protrudes from one side of the first substrate 415 in a length direction of the first substrate 415.

The protrusion 4137 may be formed in a region, where the plurality of first pins 4131 are formed, in a right upper surface region of the first substrate 415.

Accordingly, the sides of the plurality of first pins 4131 are not put on the same vertical line as the side of the first substrate 415.

Unlike this, the second pin 4132, the third pin 4133, the fourth pin 4134, the fifth pin 4135, and the sixth pin 4136 are put on the same vertical line as the side of the first substrate 415.

Figure 12:
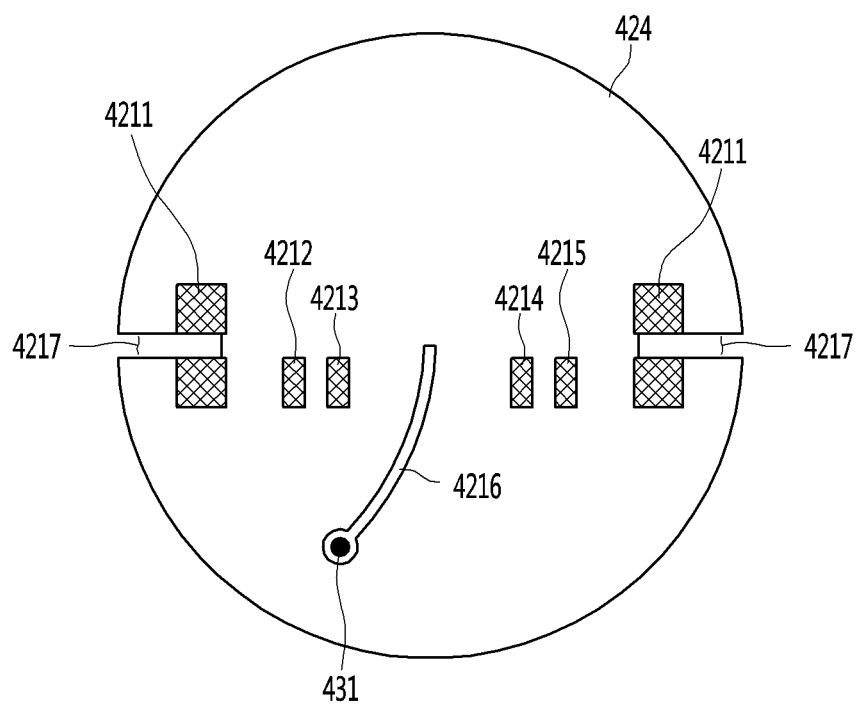
FIG. 12 is a view illustrating an upper surface of a sensor module according to an embodiment of the present invention.
Figure 13:
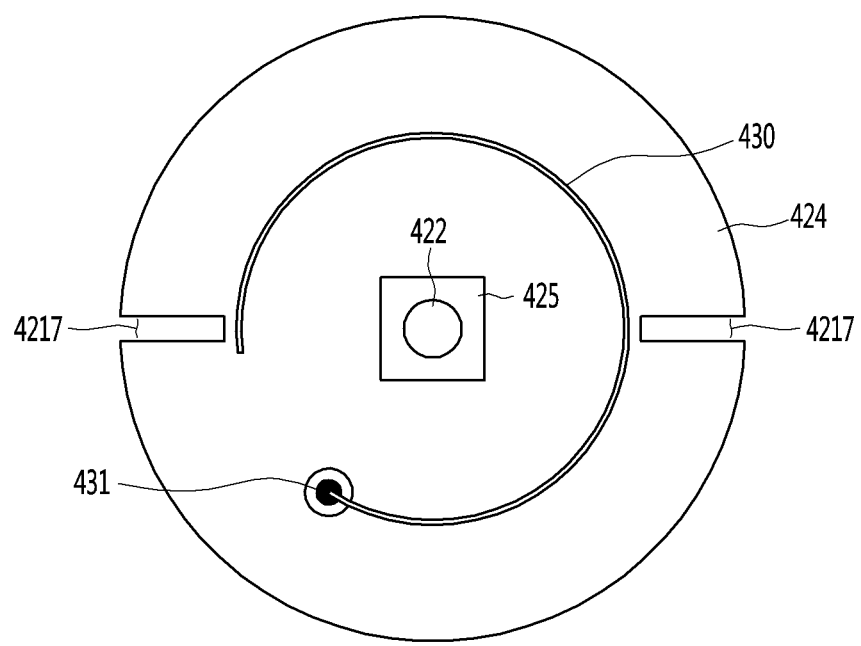
FIG. 13 is a view illustrating a lower surface of the sensor module according to an embodiment of the present invention.

FIG. 12 is a view illustrating an upper surface of the sensor module according to an embodiment of the present invention, and FIG. 13 is a view illustrating the lower surface of the sensor module according to an embodiment of the present invention.

Referring to FIG. 12, the sensor module 420 includes a second substrate 424.

The second substrate 424 may be a substrate in which a circuit pattern is printed on an insulator. For example, the second substrate 424 may include a general PCB, a metal core PCB, a flexible PCB, a ceramic PCB, and the like. Also, the second substrate 424 may be made of a material which efficiently reflects light, or the surface of the second substrate 424 may have a color which effectively reflects light, for example, a white color, a silver color, or the like.

An interface unit 421 is formed on an upper surface of the second substrate 424.

The interface unit 421 includes a plurality of pins to be connected to the second interface unit 413 of the communication module 410.

Preferably, the interface unit 421 includes a first pin 4211 to be connected to the first pin 4131 of the second interface unit 413, a second pin 4212 to be connected to the second pin 4132 of the second interface unit 413, a third pin 4213 to be connected to the third pin 4133 of the second interface unit 413, a fourth pin 4214 to be connected to the fourth pin 4134 of the second interface unit 413, a fifth pin 4215 to be connected to the fifth pin 4135 of the second interface unit 413, and a sixth pin 4216 to be connected to the sixth pin 4136 of the second interface unit 413.

The first to sixth pins 4211 to 4216 of the interface unit 421 are connection patterns formed by printing (or patterning) a metal material on the upper surface of the second substrate 424.

On the other hand, the second substrate 424 includes a connection hole 4217 penetrating the upper surface and the lower surface of the second substrate 424 in a region where the first pin 4211 is formed.

One end of the sixth pin 4216 is connected to an antenna feed point 431 formed on the upper surface of the second substrate 424.

Referring to FIG. 13, a sensor unit 422 is formed on the lower surface of the second substrate 424. The sensor unit 422 is substantially a sensor element. In other words, the sensor unit 422 may be an infrared sensor.

A light concentration plate 425 covering the sensor unit 422 is formed on the lower surface of the second substrate 424.

In this case, the sensor unit 422 and the light concentration plate 425 may be formed in a middle region of the lower surface of the second substrate 424.

An antenna 430 is formed on the lower surface of the second substrate 424.

The antenna 430 is connected to the antenna feed point 431 formed on the upper surface of the second substrate 424.

The antenna 430 may be formed in a pole type on the lower surface of the second substrate 424.

In this case, the antenna 430 may be formed in edge region of the lower surface of the second substrate 424. That is, the antenna 430 may be disposed to surround the sensor unit 422 and the light concentration plate 425 formed on the lower surface of the second substrate 424.

The second substrate 424 may have a circular shape.

Figure 14:
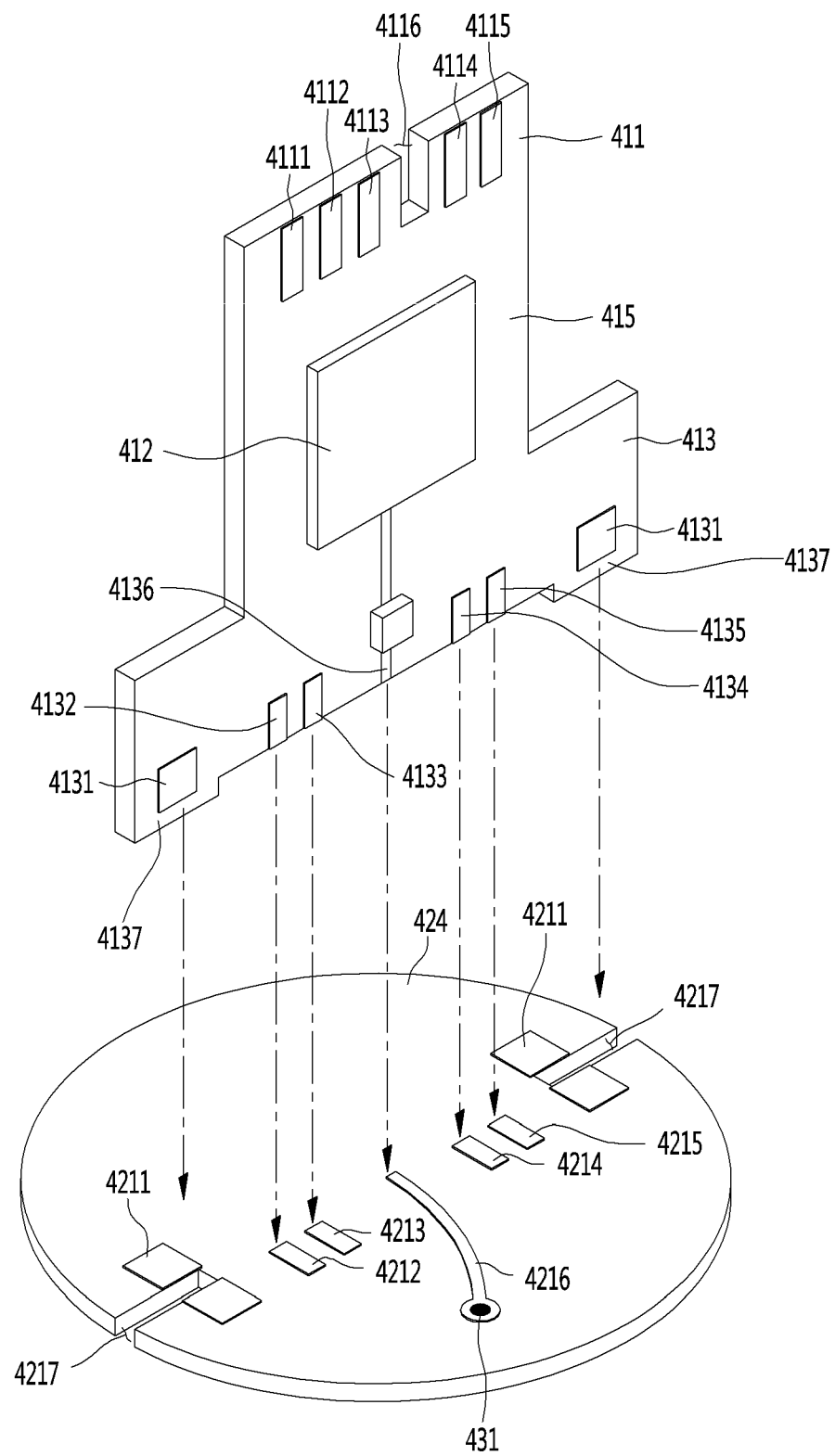
FIGS. 14 and 15 are views for describing a connected structure of the communication module and the sensor module according to an embodiment of the present invention.
Figure 15:
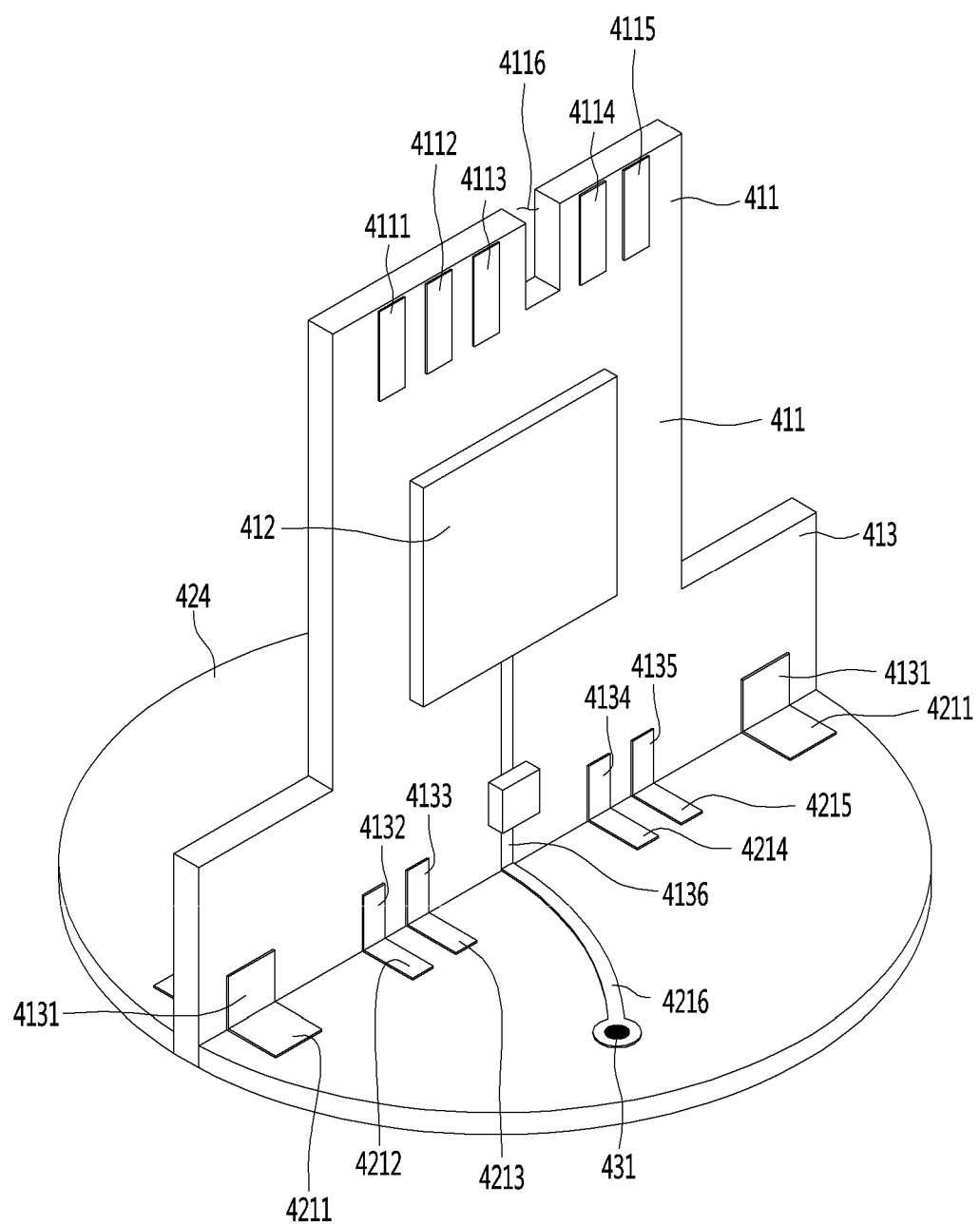

FIGS. 14 and 15 are views for describing a connected structure of the communication module and the sensor module according to an embodiment of the present invention.

Referring to FIG. 14, the sensor module 420 may be disposed such that the upper surface of the second substrate 424 is directed upward. The upper surface of the second substrate 424 means a region where the interface unit 421 is formed.

The first substrate 415 of the communication module 410 is disposed above the second substrate 424. In this case, the first interface unit 411 is disposed upward in a state of standing upright.

The connection hole 4217 is formed in the second substrate 424 of the sensor module 420, and the protrusion 4137 is formed in the first substrate 415 of the communication module 410.

Referring to FIG. 15, the protrusion 4137 of the first substrate 415 standing upright is inserted into the connection hole 4217 of the second substrate 424.

When the protrusion 4137 of the first substrate 415 is inserted into the connection hole 4217 of the second substrate 424, the pins of the second interface unit 413 formed in the first substrate 415 are mutually connected to the pins of the interface unit 421 formed in the second substrate 424.

That is, when the protrusion 4137 of the first substrate 415 is inserted into the connection hole 4217 of the second substrate 424, a right side surface of the first substrate 415 contacts the upper surface of the second substrate 424.

The right side surface of the first substrate 415 and the right side surface of each pin of the second interface unit 413 are placed on the same vertical line. Accordingly, when the right side surface of the first substrate 415 contacts the upper surface of the second substrate 424, the pins of the second interface unit 413 also contact the upper surface of the second substrate 424.

In this case, the pins constituting the interface unit 421 are disposed on the second substrate 424. In other words, the pins constituting the interface unit 421 are disposed on the upper surface of the second substrate 424 contacting the pins of the second interface unit 413.

Accordingly, the second interface unit 413 formed in the first substrate 415 are electrically connected to the interface unit 421 formed in the second substrate 424.

The first substrate 415 may be fixed on the second substrate 424 by performing a coupling process in a state in which the second interface unit 413 formed in the first substrate 415 is electrically connected to the interface unit 421 formed in the second substrate 424.

Figure 16:
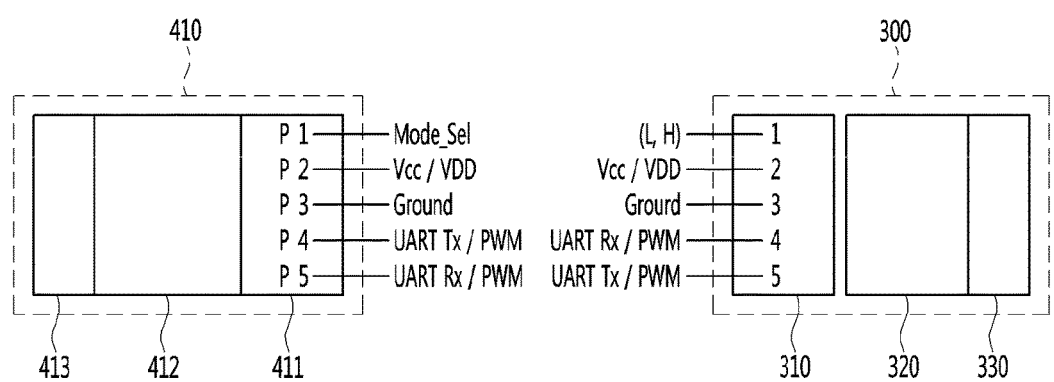
FIG. 16 is a view illustrating an interface relationship between the lighting module and the communication module according to an embodiment of the present invention.
Figure 17:
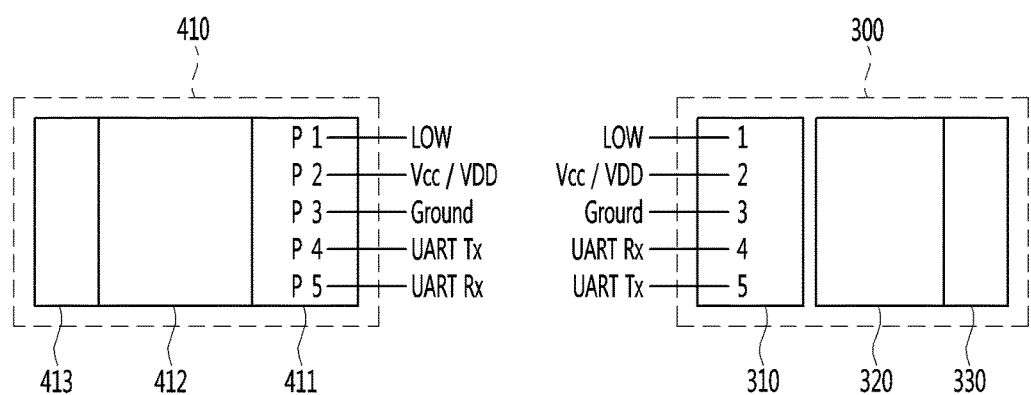
FIG. 17 is a view illustrating an embodiment of the interface relationship of FIG. 16.
Figure 18:
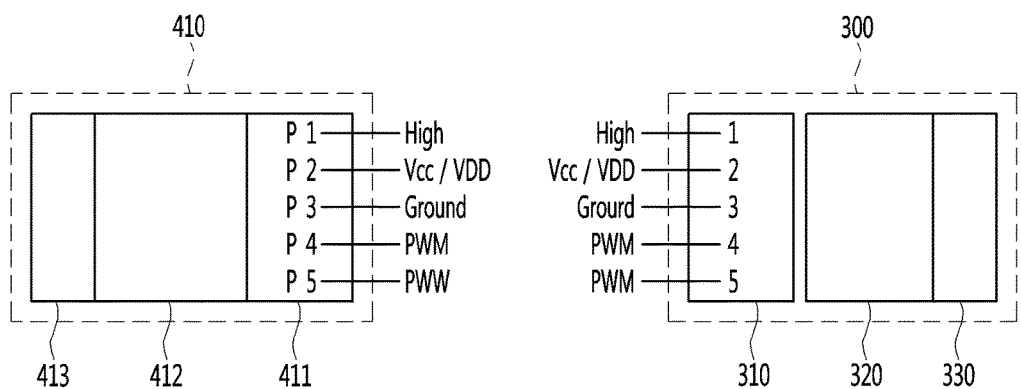
FIG. 18 is a view illustrating another embodiment of the interface relationship of FIG. 16.
Figure 19:
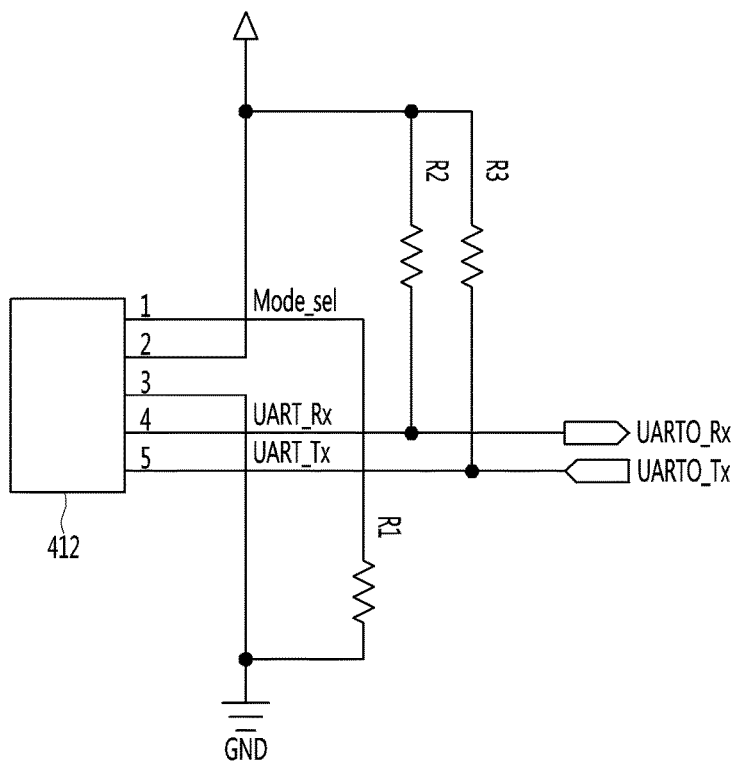
FIG. 19 is a circuit diagram of the communication module that satisfies the interface relationship of FIG. 17.
Figure 20:
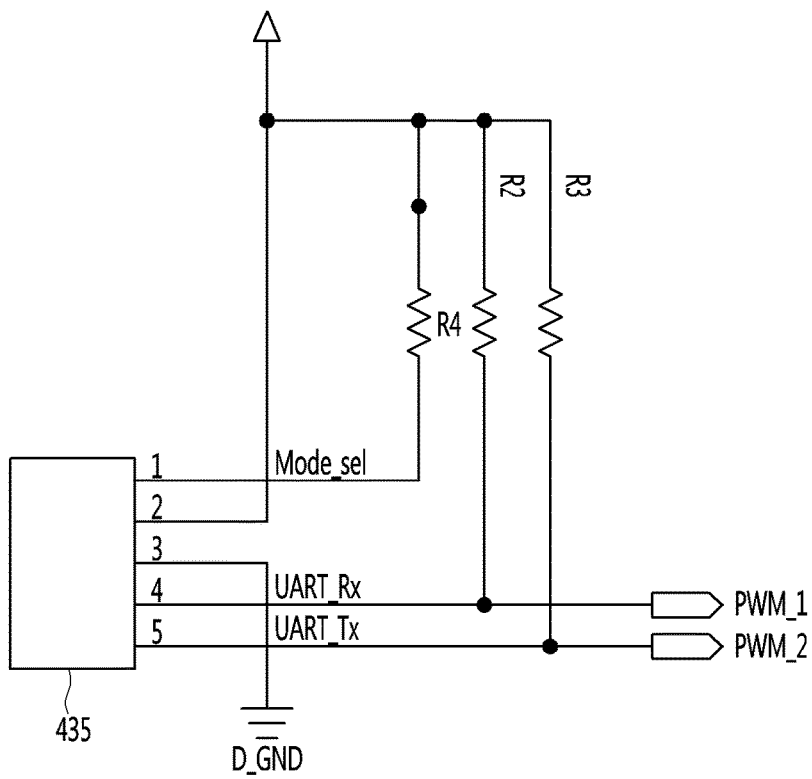
FIG. 20 is a circuit diagram of the communication module that satisfies the interface relationship of FIG. 18.

FIG. 16 is a view illustrating an interface relationship between the lighting module and the communication module according to an embodiment of the present invention. FIG. 17 is a view illustrating an embodiment of the interface relationship of FIG. 16. FIG. 18 is a view illustrating another embodiment of the interface relationship of FIG. 16. FIG. 19 is a circuit diagram of the communication module that satisfies the interface relationship of FIG. 17. FIG. 20 is a circuit diagram of the communication module that satisfies the interface relationship of FIG. 18.

Referring to FIG. 16, when the first interface unit 411 of the communication module 410 constituting the communication device 400 has five pins P1 to P5, output signals shown in FIG. 16 are set to the pins P1 to P5 of the first interface unit 411 of the first interface unit 411 and the pins of the connector of the interface unit 310 of the lighting module 300.

That is, the first pin P1 is configured to output a mode control signal Mode_sel that defines a mode selection according to a lighting control method, the second pin P2 is configured to receive a reference voltage Vcc/VDD that drives the communication module 410, the third pin P3 is configured to receive a ground voltage Ground, and the fourth pin P4 and the fifth pin P5 are configured to transmit and receive a lighting control signal or transmit different types of the lighting control signal.

That is, the first to third pins P1 to P3 are pins associated with the reference voltage, and the fourth and fifth pins P4 and P5 are pins associated with the control signal. The recess 4116 may be formed between the third pin P3 and the fourth pin P4.

As the lighting control method, a UART method or a PWM method may be applied. The mode control signal Mode_sel is set to be high or low according to the lighting control method.

The UART method will be described below with reference to FIGS. 17 and 19. The UART method uses two pins. Specifically, one pin is used for signal reception, and the other pin is used for signal transmission.

The UART method is applied for controlling flat-panel lighting or lighting requiring a relatively more control and is used for controlling an LED lighting (color temperature, brightness, dimming, etc.), but is not limited thereto. The UART method may be changed according to setting. The lighting module 300 usually includes a separate control unit (MCU). However, in the UART method, the control unit is not included in the lighting module 300, and thus, the communication module 410 can directly control the lighting module 300.

As such, when the lighting module 300 is controlled by the UART method, the mode selection signal Mode_sel is set to be low, the fourth pin P4 is set as a transmission pin, and the fifth pin P5 is set as a reception pin.

To this end, the wireless communication unit 412 includes a circuit shown in FIG. 19.

That is, the circuit is formed between five terminals of the wireless communication unit 412 and five pins P1 to P5 of a terminal region 450a. When the reference voltage and the ground voltage are applied, the fourth and fifth pins P4 and P5 are connected to the reference voltage by pull-up resistors R2 and R3, respectively.

In this case, the first pin P1 outputting the mode selection signal is connected to the ground voltage by a first pull-down resistor R1, and the mode selection signal Mode_sel is set to have a low value.

The PWM method will be described below with reference to FIGS. 18 and 20. The PWM method is a control method used for simply adjusting brightness like an LED, but is not limited thereto. The lighting module 300 may adjust lighting brightness based on a duty ratio of a pulse width.

In this case, the lighting brightness may include a color temperature control, a brightness control, and a dimming control.

As such, when the lighting module 300 is controlled by the PWM method, the mode selection signal Mode_sel is set to be high, the fourth pin P4 controls a warm color temperature during dimming, and the fifth pin P5 controls a cool color temperature during dimming. Therefore, during the color temperature control, the control signal is simultaneously outputted to the fourth and fifth pins P4 and P5.

To this end, the wireless communication unit 412 includes a circuit shown in FIG. 20.

That is, when the reference voltage and the ground voltage are applied, the fourth and fifth pins P4 and P5 are connected to the reference voltage by pull-up resistors R2 and R3, respectively.

In this case, the first pin P1 outputting the mode selection signal Mode_sel is connected to the reference voltage by a fourth pull-up resistor R4, and the mode selection signal Mode_sel is set to have a high value.

The lighting control using the five pins P1 to P5 has been describing above, but the present invention is not limited thereto. The lighting can be controlled by using a plurality of pins.

Also, the change from the UART method to the PWM method may be selected according to the mode selection signal, but may also be implemented through the switch on the surface of the communication module.

Figure 21:
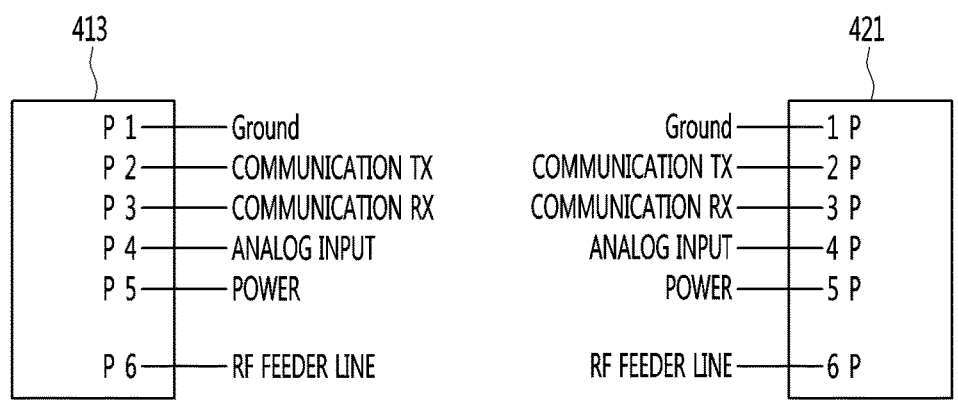
FIG. 21 is a view illustrating an interface relationship between the communication module and the sensor module according to an embodiment of the present invention.

FIG. 21 is a view illustrating an interface relationship between the communication module and the sensor module according to an embodiment of the present invention.

Each of the second interface unit 413 of the communication module 410 and the interface unit 421 of the sensor module 420 includes first to sixth pins.

The first pin P1 included in each of the second interface unit 413 of the communication module 410 and the interface unit 421 of the sensor module 420 is used for ground.

The second pin P2 included in each of the second interface unit 413 of the communication module 410 and the interface unit 421 of the sensor module 420 is used for signal communication to transmit a signal from the sensor module to the communication module.

The third pin P3 included in each of the second interface unit 413 of the communication module 410 and the interface unit 421 of the sensor module 420 is used for signal communication to transmit a signal from the communication module to the sensor module.

The fourth pin P4 included in each of the second interface unit 413 of the communication module 410 and the interface unit 421 of the sensor module 420 is used for analog signal communication to transmit an analog signal from the sensor module to the communication module.

The fifth pin P5 included in each of the second interface unit 413 of the communication module 410 and the interface unit 421 of the sensor module 420 is used for power supply.

The sixth pin P6 included in each of the second interface unit 413 of the communication module 410 and the interface unit 421 of the sensor module 420 is used as a feeder line of an RF signal.

Figure 22:
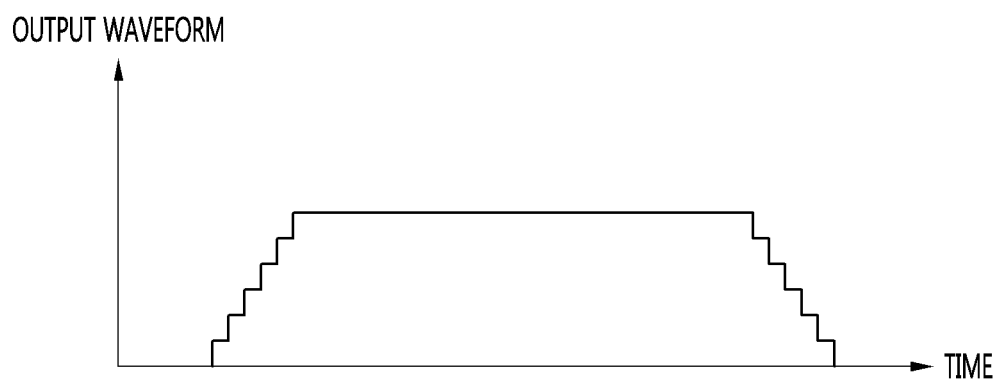
FIG. 22 is a view for describing an operation of the sensor module according to an embodiment of the present invention.

FIG. 22 is a view for describing an operation of the sensor module according to an embodiment of the present invention.

Referring to FIG. 22, the sensor module is implemented by an infrared sensor.

As shown in FIG. 22, the infrared sensor senses a human body and continuously outputs a sensing signal regarding the human body even when there is no motion of the sensed human body.

As shown in FIG. 22, an output waveform of the infrared sensor has a constant level at a time point when the human body is sensed, and continuously outputs a sensing signal having a level continuously changing even when there is no motion of the human body.

Accordingly, when the user's body is sensed, the lighting module can continuously perform an on operation according to the sensing signal of the infrared sensor.

According to embodiments, the communication device is detachably formed in the lighting device. Thus, when the lighting unit of the lighting device is replaced, the communication device can be kept apart, thereby reducing costs.

According to embodiments, when the characteristics (color temperature, dimming value, brightness, etc.) of the lighting device in the communication module are controlled, the effective control can be performed by selectively using the PWM control method and the UART control method based on the characteristics to be controlled.

According to embodiments, various wireless communication schemes (ZigBee, WiFi, Bluetooth, etc.) can be selectively implemented in the wireless communication unit of the communication module. Thus, it is possible to perform an effective data transmission/reception and control by selectively using an optimal wireless communication scheme by taking into account a speed, a distance, and power consumption.

According to embodiments, the plurality of pins of the interface unit of the communication module can be standardized in predetermined order and according to purposes.

Also, according to embodiments, the communication module is integrally formed with the sensor module. Thus, it is possible to efficiently control the lighting by using the sensing signal of the sensor as well as the lighting control signal of the user transmitted from the outside.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A communication device comprising:
a communication module comprising a first substrate, and a communication element attached to one surface of the first substrate; and
a sensor module comprising a second substrate connected to the first substrate, and a sensor element attached to one surface of the second substrate,
wherein the communication module comprises a first interface unit detachably connected to a connector of an object and configured to transmit, to the object, a lighting control signal received via a wireless network and a sensing signal sensed through the sensor module; and
wherein the communication module comprises:
the first interface unit formed in a left region of an upper surface of the first substrate;
a second interface unit formed in a right region of the upper surface of the first substrate; and
the communication element mounted between the first interface unit and the second interface unit, wherein the first interface unit, the communication element, and the second interface unit are integrally formed as a single unit;
wherein the sensor module comprises a third interface unit formed on an upper surface of the second substrate and electrically connected to the second interface unit, and
the sensor element is attached to a lower surface of the second substrate; and
wherein a protrusion protruding in a length direction of the first substrate is formed on the right region of the upper surface of the first substrate of the communication module,
a connection hole penetrating the upper surface and the lower surface of the second substrate is formed in the second substrate, and
the communication module is inserted into the connection hole of the second substrate and connected to the sensor module in a state of standing upright such that the protrusion of the first substrate is directed downward.

2. The communication device of claim 1,
wherein the second interface unit comprises a plurality of pins, and
right side surfaces of the plurality of pins are formed on the same vertical line as the right region of the upper surface of the first substrate.

3. The communication device of claim 2,
wherein the right side surfaces of the plurality of pins constituting the second interface unit contact the upper surface of the second substrate in the state of standing upright such that the protrusion of the first substrate is directed downward, and
the third interface unit is formed in a region contacting the right side surfaces of the plurality of pins on the upper surface of the second substrate.

4. The communication device of claim 1,
wherein the plurality of pins constituting the second interface unit comprises:
a first pin for ground;

a second pin for signal transmission;
a third pin for signal reception;
a fourth pin for analog signal reception;
a fifth pin for power supply; and
a sixth pin for a feeder line formation.

5. The communication device of claim 4,
wherein the third interface unit comprises seventh to twelfth pins respectively connected to the first to sixth pins of the second interface unit.

6. The communication device of claim 5,
wherein the seventh to twelfth pins of the third interface unit formed on the upper surface of the second substrate are respectively formed in regions contacting side surfaces of the first to sixth pins formed on the first substrate in the state of standing upright such that the protrusion of the first substrate is directed downward.

7. The communication device of claim 1,
wherein the sensor module comprises:
a light concentration plate disposed on the lower surface of the second substrate to cover the sensor element; and
an antenna formed on the lower surface of the second substrate and disposed to surround the sensor element and the light concentration plate.

8. The communication device of claim 7, further comprising:
a housing having an inner accommodation space and accommodating the communication module except for the first interface unit; and
a front protection cover disposed on the lower surface of the second substrate and covering the sensor element, the light concentration plate, and the antenna.

9. A lighting device comprising:
a lighting module comprising at least one light source; and
the communication device of claim 1.

10. The lighting device of claim 9,
wherein the sensor element is an infrared sensor, and
the lighting module controls the at least one light source based on a human body sensing signal from the infrared sensor.

* * * * *